(12) United States Patent
Benco et al.

(10) Patent No.: US 7,283,785 B2
(45) Date of Patent: Oct. 16, 2007

(54) AUDIO QUALITY COMPONENT

(75) Inventors: David S. Benco, Winfield, IL (US); Kevin J. Overend, Elmhurst, IL (US); Baoling S. Sheen, Naperville, IL (US); Sandra L. True, St. Charles, IL (US); Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 627 days.

(21) Appl. No.: 10/818,286

(22) Filed: Apr. 5, 2004

(65) Prior Publication Data

US 2005/0221753 A1 Oct. 6, 2005

(51) Int. Cl.
*H04H 7/00* (2006.01)
(52) U.S. Cl. .................. 455/3.06; 455/412.2; 455/413
(58) Field of Classification Search ............... 455/3.06, 455/414.1, 414.2, 414.3, 156.1, 413, 412.1, 455/412.2, 562.1; 370/394, 428; 379/59, 379/88
See application file for complete search history.

(56) References Cited

U.S. PATENT DOCUMENTS

| 4,761,807 | A | * | 8/1988 | Matthews et al. | ........ 379/88.26 |
| 5,313,515 | A | * | 5/1994 | Allen et al. | .................. 455/413 |
| 6,373,842 | B1 | * | 4/2002 | Coverdale et al. | .......... 370/394 |
| 6,453,022 | B1 | * | 9/2002 | Weinman, Jr. | ........... 379/88.13 |
| 6,829,474 | B1 | * | 12/2004 | Adachi | ..................... 455/414.1 |
| 2002/0086662 | A1 | * | 7/2002 | Culliss | ....................... 455/413 |
| 2005/0050349 | A1 | * | 3/2005 | Bobo | ......................... 713/200 |

* cited by examiner

*Primary Examiner*—Matthew Anderson
*Assistant Examiner*—Tan Trinh

(57) ABSTRACT

An audio quality component of an apparatus in one example, upon a determination that an audio message by a sender fails to meet one or more audio thresholds, provides an indication of the determination to the sender before finalization of the audio message for an intended recipient.

18 Claims, 2 Drawing Sheets

AUDIO QUALITY COMPONENT

TECHNICAL FIELD

The invention relates generally to audio quality and more particularly to audio quality of audio messages for a recipient.

BACKGROUND

As electronic devices become ubiquitous in communications, many messages are recorded by electronic devices instead of being written down by a user. Voice message systems and answering machines lack a capability to determine a quality of the message. Voice message systems require the user to manually request a playback of their message, which places the burden of quality control on the user. Many users assume their message was taken with sufficient quality and do not choose to play back their message. Messages from users on a mobile phone are often of low quality. For example, the message comprises audio characteristics such as excessive clicks and pops, high levels of background noise, or low overall volume. Messages with these audio characteristics are difficult to understand for an intended recipient.

Thus, a need exists for an increase in audio quality of audio messages for an intended recipient.

SUMMARY

In one embodiment, there is provided an apparatus comprising an audio quality component that, upon a determination that an audio message by a sender fails to meet one or more audio thresholds, provides an indication of the determination to the sender before finalization of the audio message for an intended recipient.

In another embodiment, there is provided a method for providing an indication to a sender of an audio message upon a determination that the audio message fails to meet one or more audio thresholds.

In yet another embodiment, there is provided an article comprising one or more computer-readable signal-bearing media. The article includes means in the one or more media for providing an indication to a sender of an audio message upon a determination that the audio message fails to meet one or more audio thresholds.

DESCRIPTION OF THE DRAWINGS

Features of exemplary implementations of the invention will become apparent from the description, the claims, and the accompanying drawings in which:

DETAILED DESCRIPTION

Figure 1:
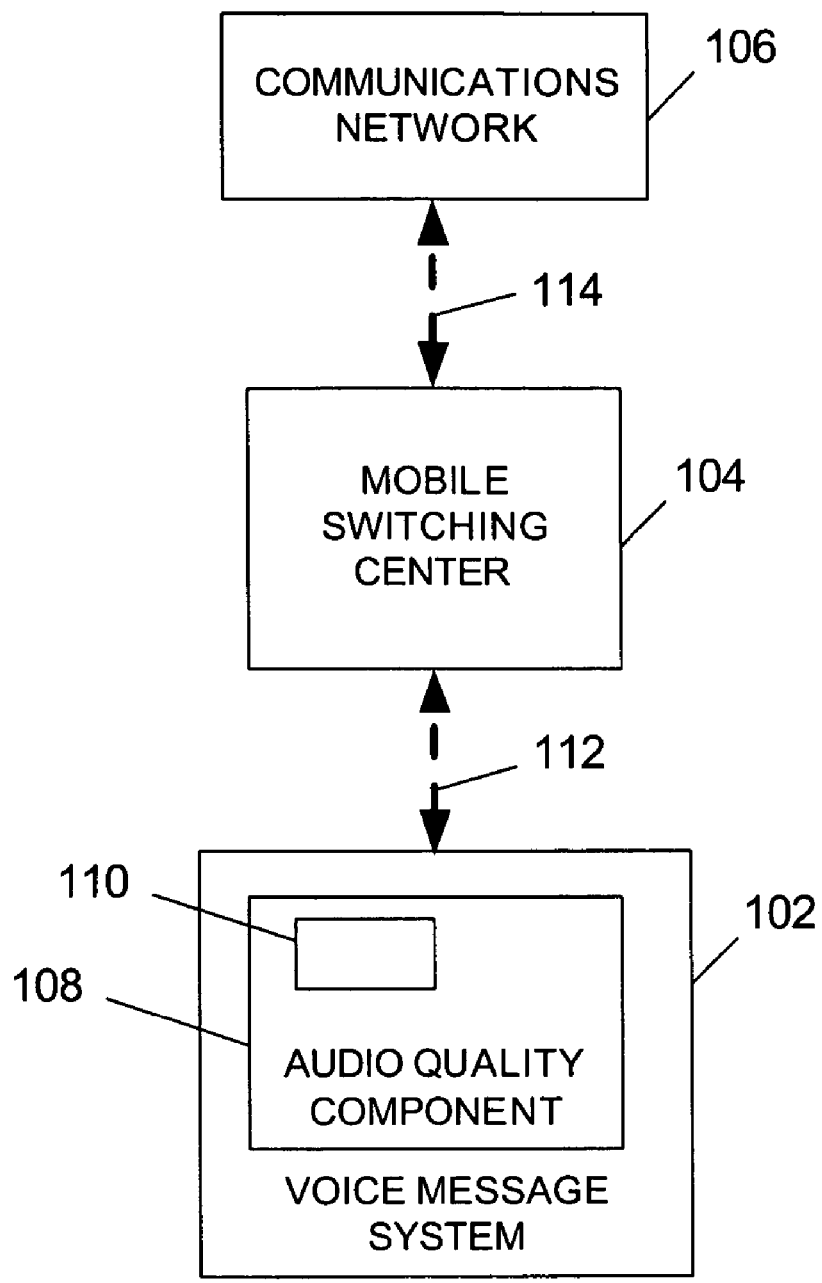
FIG. 1 is a representation of one implementation of an apparatus that comprises a voice message system, a mobile switching center, and a communications network.

Turning to FIG. 1, an apparatus 100 in one example comprises a voice message system 102, a mobile switching center 104, and communications network 106. The voice message system 102 comprises a portion of a cellular communication network (not shown). The voice message system 102 in one example comprises an audio quality component 108. The voice message system 102 serves to record audio messages, for example, a voice message, from a sender for an intended recipient, as will be appreciated by those skilled in the art.

The audio quality component 108 in one example comprises one or more digital signal processors ("DSPs") and/or one or more filters. The audio quality component 108 serves to analyze the audio message for the intended recipient and determine if the audio message is of sufficient quality. For example, the audio quality component 108 compares one or more audio characteristics of the audio message with one or more audio thresholds. If one or more of the one or more audio characteristics fail to meet the one or more audio thresholds, the message is not of sufficient quality, as will be appreciated by those skilled in the art. Exemplary audio characteristics comprise signal strength, signal variability, signal spikes, periodic noise, and feedback. In a further example, exemplary audio characteristics comprise speech patterns of the sender. The audio thresholds in one example are pre-determined by a mobile subscriber or an operator of the mobile switching center 104. The audio quality component 108 in one example comprises an instance of a recordable data storage medium 110, as described herein.

The mobile switching center 104 in one example routes calls to and/or from mobile subscribers, for example, to a mobile communication device of the mobile subscriber (not shown). The mobile switching center 104 is communicatively coupled with the voice message system 102 via a communication link 112. The mobile switching center 104 routes audio messages to the voice message system 102 via the communication link 112, as will be appreciated by those skilled in the art.

The communications network 106 in one example comprises a public switched telephone network ("PSTN"), a cellular network, a satellite network, or an internet protocol ("IP") network. The communications network 106 is communicatively coupled with the mobile switching center 104 via a communication link 114. The mobile switching center 104 receives calls from the communications network 106 for the mobile subscribers via the communication link 114.

Figure 2:
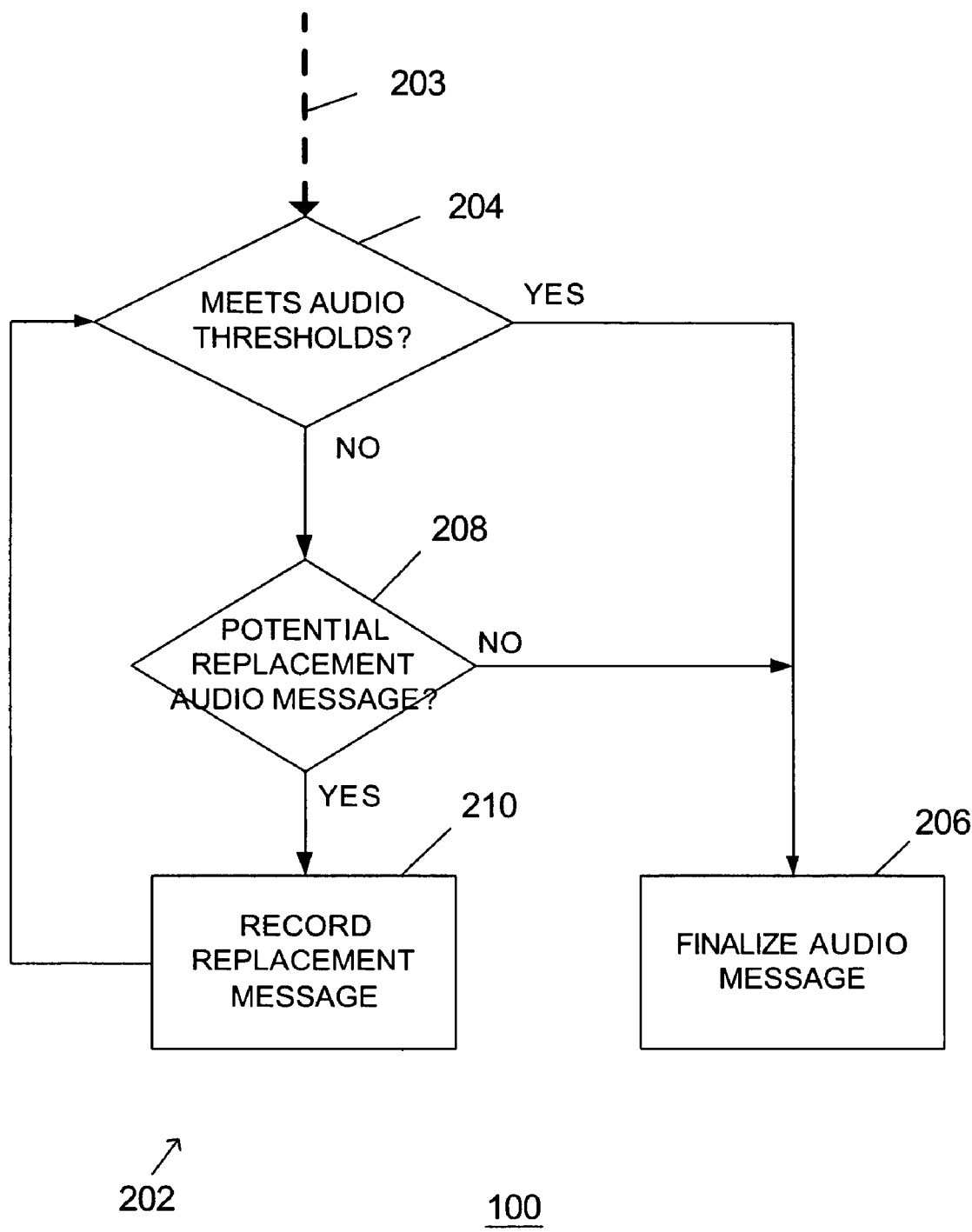
FIG. 2 is a representation of a logic flow for finalizing a message by the voice message system of FIG. 1.

Turning to FIG. 2, a logic flow 202 comprises a logic flow of the voice message system 102. The voice message system 102 receives an audio message 203 from a sender of the communications network 106, for example, from mobile subscriber or landline subscriber. The audio quality component 108 makes a comparison (STEP 204) of one or more audio characteristics of the audio message 203 with one or more audio thresholds, for example, pre-determined audio thresholds. If the audio quality component 108 makes a determination that the audio message 203 meets the audio thresholds, the audio quality component 108 finalizes (STEP 206) the audio message 203 for the intended recipient.

If the audio quality component 108 makes a determination that the audio message 203 does not meet one or more of the one or more audio thresholds, the audio quality component 108 requests (STEP 208) a potential replacement audio message from the sender. If the sender does not provide a potential replacement audio message, the audio quality component 108 finalizes the audio message 203 for the intended recipient.

If the sender provides a potential replacement audio message, the voice message system 102 records (STEP 210) the potential replacement audio message. The audio quality component 108 then returns to STEP 204 to determine if the potential replacement audio message meets the one or more audio thresholds. In a further example, the voice message system 102 records up to three potential replacement audio messages. If none of the audio messages meet the one or more audio thresholds, the audio quality component 108 selects one of the audio messages to finalize for the intended recipient. For example, the audio quality component 108 selects a highest quality audio message of the audio messages. In another example, the voice message system 102 plays the audio message back to the sender to verify a quality level of the audio message, as will be appreciated by those skilled in the art.

An illustrative description of exemplary operation of the apparatus 100 is presented, for explanatory purposes. The mobile switching center 104 receives an incoming call for an intended recipient from a sender on the communications network 106. For example, a mobile subscriber from the communications network 106 places a call to a mobile subscriber of the mobile switching center 104. The intended recipient is not available, and the mobile switching center 104 routes the incoming call to the voice message system 102. The voice message system 102 records a first audio message from the sender.

The audio quality component 108 makes a comparison of one or more audio characteristics of the first audio message with one or more audio thresholds. In one example, the audio quality component 108 makes a determination that the first audio message meets the one or more audio thresholds. The audio quality component 102 finalizes the first audio message for the intended recipient. For example, the voice message system 102 stores the first audio message in a voice mail box for later retrieval by the intended recipient.

In another example, the audio quality component 108 makes a determination that the first audio message fails to meet at least one of the one or more audio thresholds. For example, the first audio message comprises an average volume that is below a pre-determined threshold. The audio quality component 108 provides an indication of the determination to the sender before finalization of the first audio message for the intended recipient. For example, the sender receives a message that indicates the first audio message was not sufficiently loud.

The audio quality component 108 requests from the sender a second audio message, for example, a potential replacement audio message. In one example, the sender does not provide the potential replacement audio message. The audio quality component 108 finalizes the audio message for the intended recipient. In another example, the sender provides a potential replacement audio message. The audio quality component 108 records the potential replacement audio message and makes a determination if the potential replacement audio message meets the one or more audio thresholds. For example, the audio quality component 108 makes a comparison of one or more audio characteristics of the potential replacement message with the one or more audio thresholds. If the audio quality component 108 determines that the potential replacement audio message meets the one or more audio thresholds, the audio quality component 108 finalizes potential replacement audio message for the intended recipient.

If the audio quality component 108 determines that the potential replacement audio message does not meet one or more of the one or more audio thresholds, the audio quality component 108 requests one or more additional potential replacement audio messages. The audio quality component 108 in one example continues to request additional potential replacement audio messages until a potential replacement audio message that meets the one or more audio thresholds is found.

In another example, the audio quality component 108 requests a pre-determined number of additional potential replacement audio messages. For example, the audio quality component 108 requests up to three additional potential replacement audio messages. The audio quality component 108 makes a comparison of the audio characteristics of the audio messages to select one audio message to finalize for the intended recipient, as will be appreciated by those skilled in the art.

The audio quality component 108 in one example employs one or more digital signal processors to obtain the audio characteristics of the audio messages. In a further example, the audio quality component 108 employs one or more filters and/or digital signal processors to obtain one or more filtered messages from the audio message, for example, to reduce background noise of the audio message. The audio quality component 108 substitutes the filtered message for the audio message, as will be appreciated by those skilled in the art.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. Examples of a computer-readable signal-bearing medium for the apparatus 100 comprise the recordable data storage medium 110 of the audio quality component 108. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   an audio quality component that, upon a determination that an audio message by a sender fails to meet one or more audio thresholds, provides an indication of the determination to the sender before finalization of the audio message for an intended recipient;
   wherein the audio quality component makes the determination that the audio message by the sender fails to meet the one or more audio thresholds; and
   wherein the one or more audio thresholds comprise one or more pre-determined audio thresholds, and wherein the determination that the audio message by the sender fails to meet the one or more audio thresholds comprises a comparison of one or more audio characteristics of the audio message with the one or more predetermined audio thresholds.

2. The apparatus of claim 1, wherein the audio message comprises a first audio message;
wherein the audio quality component requests a potential replacement audio message from the sender.

3. The apparatus of claim 2, wherein the audio quality component makes a comparison of one or more audio characteristics of the potential replacement audio message with the one or more pre-determined audio thresholds.

4. The apparatus of claim 3, wherein the audio quality component, upon a determination that the potential replacement audio message meets the one or more audio thresholds, finalizes the potential replacement audio message for the intended recipient.

5. The apparatus of claim 2, wherein the audio quality component makes a comparison of one or more audio characteristics of the potential replacement audio message with the one or more audio characteristics of the first audio message.

6. The apparatus of claim 5, wherein the audio quality component finalizes the first audio message based on the comparison of the one or more audio characteristics of the potential replacement audio message with the one or more audio characteristics of the first audio message.

7. The apparatus of claim 5, wherein the audio quality component finalizes the potential replacement audio message based on the comparison of the one or more audio characteristics of the potential replacement audio message with the one or more audio characteristics of the first audio message.

8. The apparatus of claim 1, wherein the audio quality component comprises one or more digital signal processors (DSPs);
wherein the one or more digital signal processors obtain the one or more audio characteristics of the audio message.

9. The apparatus of claim 1, wherein the one or more audio characteristics comprise one or more speech patterns of the sender.

10. The apparatus of claim 1, wherein the one or more audio characteristics comprise signal strength, variability, signal spikes, periodic noise, and/or feedback.

11. The apparatus of claim 1, wherein the audio quality component comprises a portion of a voice message system for a cellular communication network.

12. An apparatus, comprising:
an audio quality component that, upon determination that an audio message by a sender fails to meet one or more audio thresholds, provides an indication of the determination to the sender before finalization of the audio message for an intended recipient;
wherein the audio quality component comprises one or more filters; and
wherein the audio quality component employs the one or more filters to obtain a filtered message from the audio message; and
wherein the audio quality component substitutes the filtered message for the audio message.

13. The apparatus of claim 12, wherein the audio quality component comprises a portion of a voice message system for a cellular communication network.

14. A method, comprising the step of:
providing an indication to a sender of an audio message upon a determination that the audio message fails to meet one or more audio thresholds;
receiving the audio message from the sender;
performing a comparison of one or more audio characteristics of the audio message with the one or more audio thresholds; and
finalizing the audio message if the audio message meets the one or more audio thresholds.

15. The method of claim 14, wherein the audio message comprises a first audio message, the method further comprising the steps of:
requesting a potential replacement audio message from the sender if the audio message fails to meet one or more of the one or more audio thresholds; and
finalizing the first audio message if the sender does not input the potential replacement audio message.

16. The method of claim 15, further comprising the steps of:
receiving the potential replacement audio message from the sender; and
performing a comparison of one or more audio characteristics of the potential replacement audio message with the one or more audio thresholds.

17. An article, comprising:
one or more computer-readable signal-bearing media; and
means in the one or more media for receiving an audio message from a sender;
means in the one or more media for performing a comparison of one or more audio characteristics of the audio message with one or more audio thresholds;
means in the one or more media for providing an indication to the sender of the audio message upon a determination that the audio message fails to meet one or more of the one or more audio thresholds; and
means in the one or more media for finalizing the audio message if the audio message meets the one or more audio thresholds.

18. The article of claim 17, further comprising:
means in the one or more media for requesting a potential replacement audio message from the sender if the audio message fails to meet one or more of the one or more audio thresholds;
means in the one or more media for finalizing the first audio message if the sender does not input the potential replacement audio message;
means in the one or more media for receiving the potential replacement audio message from the sender;
performing a comparison of one or more audio characteristics of the potential replacement audio message with the one or more audio thresholds.

* * * * *